United States Patent

[11] 3,604,451

| [72] | Inventor | William B. Delamater<br>9114 Valley View, Whittier, Calif. 90603 |
|---|---|---|
| [21] | Appl. No. | 870,428 |
| [22] | Filed | Nov. 12, 1969 |
| [45] | Patented | Sept. 14, 1971 |

[54] PRESSURE-REDUCING VALVE
3 Claims, 6 Drawing Figs.

[52] U.S. Cl. .................................................... 137/512.15,
137/512.4, 137/516.25
[51] Int. Cl. ...................................................... F16k 15/14
[50] Field of Search ............................................. 137/512.15,
512.4, 516.25, 220, 496, 512.1, 512.2, 512.3

[56] References Cited
UNITED STATES PATENTS

| 1,222,316 | 4/1917 | Matthewman................ | 137/516.25 |
| 1,620,131 | 3/1927 | Price ........................... | 137/220 |
| 3,027,907 | 3/1962 | Lee ............................... | 137/512.4 |
| 3,134,394 | 5/1964 | Ohta............................. | 137/496 |

FOREIGN PATENTS

| 885,821 | 4/1959 | England ....................... | 137/220 |

*Primary Examiner*—Laverne D. Geiger
*Assistant Examiner*—William H. Wright
*Attorney*—J. Calvin Brown ABSTRACT: A pressure-reducing valve is interposed between a source of liquid such as water and a discharge valve such as a nozzle for the water. When the discharge valve is opened the pressure-reducing valve allows full volume pressure flow of the liquid from its source to the discharge valve and when the liquid discharge valve is closed the pressure-reducing valve automatically closes passage of liquid therethrough from its source. An opening of the discharge valve automatically opens the pressure reducing valve to again allow liquid under full volume and without pressure drop to flow through the pressure-reducing valve and outwardly of the discharge valve.

PATENTED SEP 14 1971

3,604,451

INVENTOR,
WILLIAM B. DELAMATER,
BY Calvin Brown,
ATTORNEY

PRESSURE-REDUCING VALVE

SUMMARY

The pressure-reducing valve is used for preventing rupture of hose under liquid pressure, such as a common garden hose and hoses of the type used in washing machines. As an example, the ordinary garden hose is usually connected at one end to a bibb connected to a source of water under pressure. The discharge end of the hose may carry a nozzle of some form which controls the discharge of the water by valve means. Often the nozzle is closed and the hose allowed to lie on the ground exposed to the sun's rays. Under this environment the hose becomes heated and the water in the hose tends to expand often rupturing the hose and completely ruining the same. The pressure reducing valve is interposed between the bibb controlling passage of liquid under pressure from a source and the intake end of the hose. When the hose nozzle is open for discharge of water, the water will flow under line pressure through the pressure-reducing valve and outwardly of the nozzle without any reduction in the flowing pressure of the water. If the nozzle is closed the pressure-reducing valve will then move to stop flow of the water from he bibb to the hose and will allow reestablishment of water flow through the nozzle without any reduction in flowing pressure and volume when the nozzle is opened. In this manner the hose is prevented from rupturing. Thus the pressure reducing valve operates with any hose which is connected with a source of water under pressure to reduce the pressure when the outlet end of the hose is closed.

An object of the invention is to provide a pressure-reducing valve of simple, economical, and inexpensive construction, of few parts and wherein the pressure reducing valve may be disassembled and reassembled easily if repairs are necessary, and which is efficient in operation.

Another object is to provide a pressure-reducing valve between a source of liquid under pressure and a hose having a valved outlet end and wherein the pressure-reducing valve does not not reduce flowing pressure of liquid until the precise moment that the valved outlet is closed and when opened the pressure reducing valve reestablishes full liquid pressure and volume from its source.

A further object is a pressure-reducing valve which does not require pressure-setting arrangements nor the use of springs or other elements easily subject to malfunction.

DESCRIPTION OF THE PREFERRED EMBODIMENT

Figure 1:
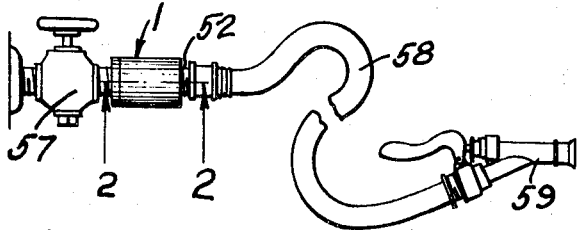
FIG. 1 is a fragmentary, side elevation showing the valve of the invention interposed between a bibb connected to a source of liquid and a hose, the discharge end of which carries a nozzle.
Figure 6:
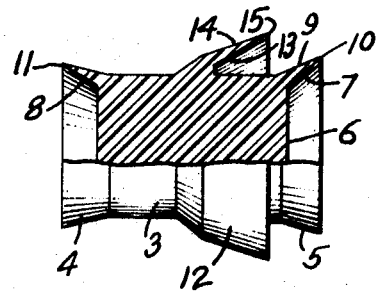
FIG. 6 is a partially sectional view of the piston of the invention.

The pressure-reducing valve 1 includes a cylinder 2 for a piston 3. The piston 3 is preferably formed of some resilient material such as rubber or rubber composition and both ends are provided with cupped portions 4 and 5 respectively. The cup portion 4 is of lesser diameter and area than the cup portion 5 and both cup portions have flat base walls designed as 6 and bevelled circular sidewalls 7. The external portions of the cup portions flare outwardly, as shown at 8 and 9 and this flaring provides a feather or knife edge for each cup portion as shown at 10 and 11. The piston body is provided substantially intermediate its length with an encircling cup portion 12. The cup portion 12 extends outwardly in the same direction as the cup portion 5 and has a greater cross-sectional area than the cup portions 4 and 5. The cup portion 12 follows a general construction like the cup portions 4 and 5 in that the cup portion has a bevelled circular surface 13 and, likewise, an external bevelled surface 14. The bevelled surfaces 13 and 14 meet in a feather edge 15.

Figure 5:
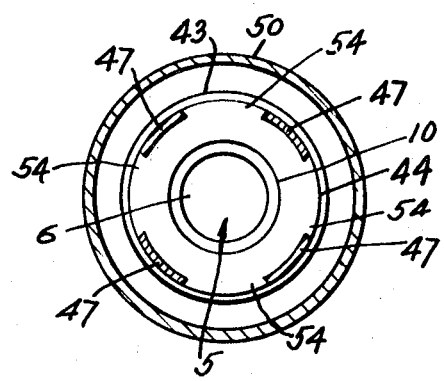
FIG. 5 is a sectional view on the line 5—5 of FIG. 3.

The cylinder 2 is formed to have a chamber 20 within which the cup 12 moves and a chamber 21 adapted to accommodate the cup member 4. Thus the piston in its reciprocation is guided by the cup member 12 in its movement within the chamber 20 and, likewise, by the cup member 4 in its movement within the chamber 21. The feather edges of both cup portions provide for sealing engagement with their respective cylinder chambers. In order to assure proper functioning of the piston in its movement within the chambers 20 and 21, the cylinder is so formed as to have a reduced diameter bore at 25, connecting larger diameter bore at 26. This is accomplished by providing the cylinder with an internal annular flange 27 having side extensions 28 and 29, the bore 21 being formed in said extensions 28 and 29 and, likewise, in the flange 27. The extension 28 is bevelled at 30. To support the cylinder, the flange 27 thereof and particularly the annular extension 29 is received between spaced posts 35 projecting on one surface from a partition 36, the partition forming a part of a fitting 37 provided with an internal screw threaded bore 38. The partition 36 is centrally bored to receive a tube 39, one end of the tube facing the threaded bore 38 and the opposite end facing the cup end 4 of piston. The opposite end 43 of the cylinder has close fit engagement with an annular block 44 in the manner shown at 45. The annular block is provided with an inner bevelled surface 46. The external end of the block 44 is provided with spaced apart circular posts 47, as shown in FIG. 5. As so far described, it is to be observed that the block 44, the cylinder end 43 and its connection with the fitting 37 are all sleeve fits without the use of set screws or by screw threading the said members in working relationship. Thus the parts may be easily separated or placed in working relationship. Surrounding the cylinder and associated members is a tubular housing 50, the open end being internally threaded at 51 for threaded engagement with the partition 36. The opposite end of the housing is closed and centrally provided with an externally threaded nipple 52. This nipple directly communicates with piston cup 5 and the posts 47 engage the inner surface 53 of the housing. The spacing of the posts 47 provides ports 54 between said posts as shown in FIG. 5, and the spacing of the post 35, provides ports therebetween at 35a. When all parts are in position, the assembly is ready for use and an example of use of the invention will be detailed.

The operation, uses and advantages of the invention are as follows.

Figure 2:
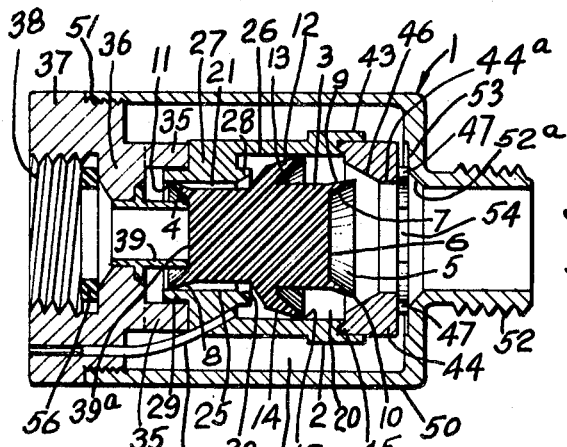
FIG. 2 is an enlarged, sectional view on the line 2—2 of FIG. 1; the valve piston being closed to stop flow of liquid through the valve.
Figure 3:
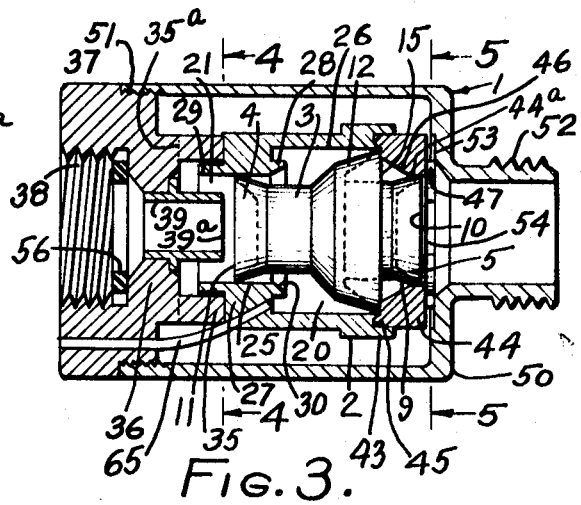
FIG. 3 is a view similar to that of FIG. 2, the valve piston being in a moved position, the valve being open for passage of liquid therethrough.
Figure 4:
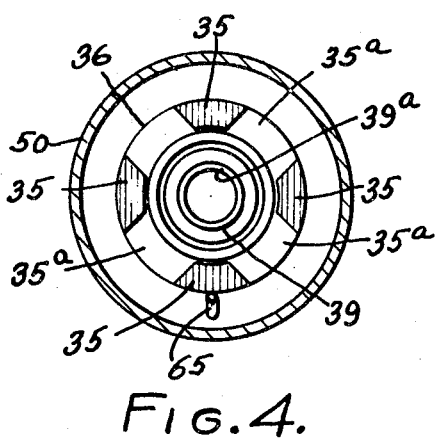
FIG. 4 is a sectional view on the line 4—4 of FIG. 3.

A washer 56 is fitted within the threaded opening 38 and bears against a wall of the partition. The valve assembly is then secured to a threaded bibb 57 which is connected to a source of water under pressure by being secured to a threaded pipe as shown in FIG. 1. This bibb is one type of valve which may be opened or closed to allow the line water under pressure to be controlled in its passage through the bibb. If the invention is to be incorporated as shown in FIG. 1 and connected to a water hose 58, then the hose has one end coupled to the threaded nipple 52 and the opposite end of the hose carries a nozzle 59 of some form. The nozzle as shown in FIG. 1 is of the type which has a handle which is spring loaded to open and close a valve and to vary the water spray from fine to coarse. The construction of the nozzle is well known and when the handle of said nozzle is in the position of FIG. 1 the passage of water though the nozzle is stopped or shut off. Assuming that the valve of the nozzle is closed and the bibb valve open, water will pass into the valve 1 through tube 39 known as the inlet valve seat tube. The line pressure of the water will contact the cup 4 of the piston and move the same to the open position as shown in FIG. 3, in which position the feather edge 10 of the cut member 5 moves against the bevelled surface 46 and the feature edge 15 of the cup 12 engages the inner end of the block 44 to stop movement of the piston. In the position shown in FIG. 3 the wall 7 of the cup 5 is compressed within the uniform bore portion 44a of the block 44. However, the feather edge 10 of said cup is spaced inwardly from the inner surface 53 of the housing and does not close the opening through nipple 52; that is to say, does not move to a position where the feather edge 10 of the cup will engage the bevelled wall 52a between the nipple and the end wall of the housing. When the parts are in the position shown in FIG. 3, the line pressure of water is from the bibb through the valve 1 into the hose and thence to the nozzle 59 when the nozzle is open. The water will pass through the inlet valve seat tube 39 and outwardly through the ports 35a into the annular space 60 between the housing 50 and the cylinder 2 thence through the ports 54 into the nipple 52 and the hose 53 to the nozzle 59. If the nozzle valve should be closed, water will not pass from the bibb through the valve 1 into the hose and through the nozzle 1 but there will be a static condition. As water is incompressible, the water from the bibb will flow against the cup 5 of the piston 3 and in so doing will flow against the static water in the hose held against outflow by the closing of the nozzle 59. The line pressure of water by flowing through the ports 54 against cup 5, moves the piston slightly until cup 5 of the piston moves from the uniform bore portion 44a of the block 44 to a position adjacent the bevel 46. Until the cup 5 moves from the uniform bore portion 44a, no water enters the cylinder chamber 20. Water may pass into the cylinder against the cup 12 which moves the piston toward the inlet tube 39. As the inlet tube end functions as a seat 39a and the seat end of said tube is received within the cup 4 as shown in FIG. 2, water flow into valve 1 is stopped.

To recapitulate, when the bibb remains open and the nozzle is closed, the liquid first impinges under pressure against the cup end 5 of the piston to move the same slightly and allow water to enter the cylinder and to be received in the cup 12. Thus there are two stages in the closing of the valve 1 after the nozzle is closed. There is a differential area relationship between the cups 4 and 5 of the piston, the inner end 4 having less area than the outer end 5 thereof with the addition of an enlarged cup 12 having a greater area than the area of the cup 5. As long as the nozzle is closed the piston stops water passage through the inlet tube 39 into the zone 60 between the housing and the cylinder. If any water is received between the periphery of the piston and the interior of the cylinder, a bleed tube 65 will conduct water from the cylinder between cup member 12 and the interior of the cylinder outwardly, as shown in the drawing. Thus there is no back water pressure on the cup members 12 and 4.

The device in actual practice has been found to work evenly, smoothly and effectively. The valve 1 assures that the hose 58 will not burst if lying in the sun filled with water, as the valve 1 effectively closes line pressure of water from entering the hose. For convenience in the description, the cup 5 is designated as a second cup and the cup 12 as the third cup, the second and third cups having different areas and both cups facing in one direction and the cup 4 is designated as the inlet first, or impact cup.

I claim:

1. A pressure-reducing valve, including: a fitting provided with a threaded bore for connection with the outlet of a bibb, said fitting having a central bore provided with an annular seat, space apart posts providing ports therebetween carried by said fitting, a cylinder having two portions of different diameters, the portion of lesser diameter being positioned between said posts, and a block having coaxial conical and uniform bores secured to the opposite larger diameter portion of the cylinder, a cylindrical housing surrounding the cylinder and secured to the fitting, the housing having an end provided with an external threaded nipple, the external threaded nipple and both diameter portions of the cylinder and the bore in the fitting being in axial alignment, said block provided with spaced apart posts for spacing said block from the end of the housing and providing ports therebetween, a piston within the cylinder, the piston provided with a first cup received in the smaller diameter portion of the cylinder, the opposite end of the piston having a second cup for reception within the uniform bore of the block, the second cup having a greater area than the first cup, and a third cup surrounding the piston substantially intermediate the first and second cups and having a greater area than the second cup, the second and third cups facing the end of the housing and the threaded nipple, the arrangement being such that when water is being passed from a source through the bibb into the pressure-reducing valve, water will impinge against the first cup to move the second piston cup into the uniform bore of the block and prevent water flow into the large diameter end of the cylinder, the third cup engaging the block to stop movement of the piston and the water under pressure flowing between the housing and the cylinder, thence through the ports on the end of the block and outwardly through the threaded nipple, the threaded nipple being connected to a nozzle, and when the nozzle is closed, water under pressure received between the cylinder and the housing impinges upon the second cup to move the piston toward the fitting, the water then being received in the cylinder for impact against the third cup to move the first cup into engagement with the annular seat to shut off water flow from the bibb.

2. A pressure-reducing valve for connection with a bibb secured to a source of water and a nozzle having connection with the pressure-reducing valve whereby when the bibb and the nozzle are open, the pressure-reducing valve is opened to permit passage of water through the nozzle and when the nozzle is closed the pressure-reducing valve closes to stop passage of water from the bibb to the nozzle, said pressure-reducing valve including: a cylindrical housing formed at one end with a threaded nipple for coupling with a nozzle, and secured at its opposite end to a fitting for connection with the bibb, a cylinder within the housing having a small diameter portion and an enlarged diameter portion, the smaller diameter portion carried by the fitting, the fitting provided with a central bore and a tube fitted within said central bore and providing an end seat portion and spaced posts surrounding the tube for receiving the small diameter end of the cylinder, the spacing between the posts providing ports communicating between the outlet of the tube and the space included between the housing and the cylinder, an annular block provided with spaced posts interposed between the housing and said block, said block and said cylinder being formed for detachable connection, a piston within said cylinder, the piston provided at one end with a first cup fitted within the small diameter portion of the cylinder and facing the seat portion of the tube and a second cup on the opposite end of the piston of greater area than the first cup and facing the block, and a third cup directed in the same direction as the second cup and of greater area than the second cup annularly surrounding the piston and fitted within the larger diameter portion of the cylinder.

3. The device as set forth in claim 2, and a liquid outlet means extending from the larger diameter portion of the cylinder externally of the housing.